Figure 1:
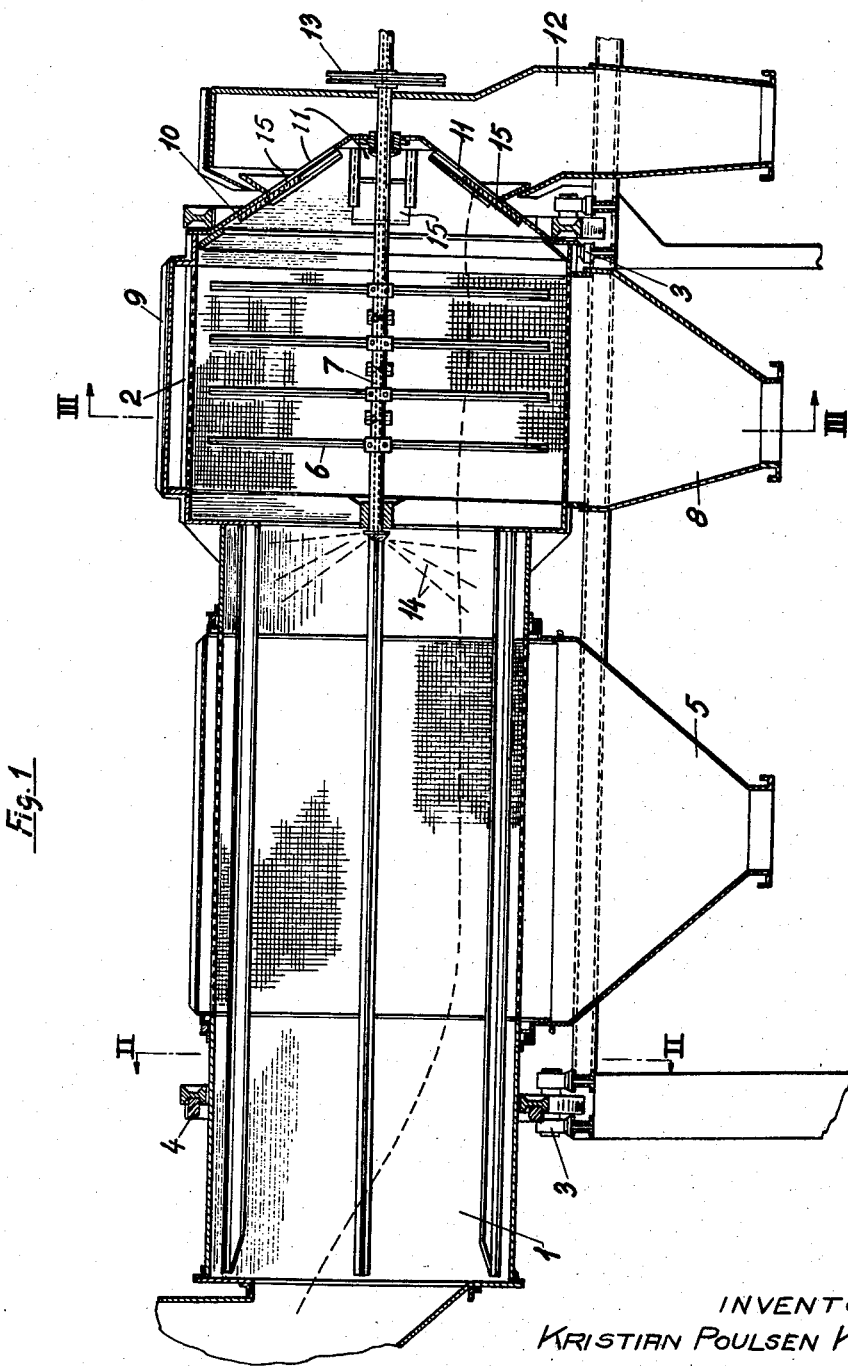

Aug. 5, 1958 K. P. KROGH 2,846,153
DRUM SIEVE WITH COMMINUTING ARMS AND
SPRAYING MEANS THEREIN
Filed May 4, 1955 2 Sheets-Sheet 1

INVENTOR:
KRISTIAN POULSEN KROGH
BY
Richardson, David and Nardon
ATTORNEYS.

Aug. 5, 1958  K. P. KROGH  2,846,153
DRUM SIEVE WITH COMMINUTING ARMS AND
SPRAYING MEANS THEREIN
Filed May 4, 1955  2 Sheets-Sheet 2

INVENTOR:
KRISTIAN POULSEN KROGH
BY
Richardson, David and Hudson
ATTORNEYS.

United States Patent Office 2,846,153
Patented Aug. 5, 1958

2,846,153

DRUM SIEVE WITH COMMINUTING ARMS AND SPRAYING MEANS THEREIN

Kristian Poulsen Krogh, Charlottenlund, near Copenhagen, Denmark

Application May 4, 1955, Serial No. 506,036

2 Claims. (Cl. 241—62)

The present invention concerns a drum sieve for the treatment of scavenging, rubbish or garbage, and consisting of at least two co-axial compartments with sieves which can rotate about an axis, the compartments being rigidly connected together in series and being in open connection with each other, and the feature of the invention consists of this, that the foremost compartment or compartments are equipped with means for sifting out the finer portions of the scavenging and that there are means for moistening its lighter parts, such as paper, which come to lie on top of the remainder of the waste, and that the rearmost compartment or compartments are equipped with a shaft, which can rotate in relation to the drum sieve and carries arms for the disintegration of the more easily disintegratable parts of the scavenging, and further that the end wall of the drum sieve has holes at some distance from the periphery of the drum for the automatic and continuous separation of the non-disintegrated larger parts of the rough waste.

As the scavenging passes through the first compartment or compartments of the drum sieve the fine waste will be sifted out, so that the drum sieve quickly unloads this part of the waste, whilst at the same time the lighter parts of the scavenging, especially its paper content, will come to lie on top of the remainder of the waste, and therefore will not hinder the sifting out of the fine waste particles by laying themselves over the sieve surface. To make the disintegration of paper etc. easier, this is sprayed in the foremost compartment or compartments of the drum sieve after it has come to lie on top of the remainder of the waste. Here it will be moistened, without the finer particles of the waste being noticeably moistened, so that the sifting out of the finer particles is not made more difficult by the added moisture. In the rearmost compartment or compartments of the drum sieve the lighter disintegratable parts of the waste are disintegrated by means of arms, which rotate in relation to the drum sieve, so that an increased rubbing between the sieve surface and the scavenging lying on the sieve surface is obtained. The arms may be rotatable or stationary. In both cases they play an active part in the disintegration. The drum sieve and the arms can rotate in opposite directions, so that a greater relative speed is obtained even though both the sieve and the arms each move relatively slowly, which from a constructional point of view may be advantageous. Simultaneously with the disintegration there occurs a sifting out of the disintegrated portions.

The non-disintegrated coarse waste will pass out through openings in the end wall of the disintegrating sieve. The size of these openings can be adjustable, for instance by means of sliding dampers, so that the height of the layer of the coarse waste can be regulated as required, and a more or less thorough disintegration of the softer part of the coarse waste may be obtained.

The sifted material from the fine sieve and from the disintegrating sieve together with the coarse waste, which without any appreciable disintegration has passed over the last sieve, can be collected each in its own hopper, or can fall directly down into the trucks which will distribute it onto the dumping ground.

By the use of the above-mentioned means it is possible with a minimum of power to obtain a rapid and certain disintegration of the scavenging and other waste matter, and the apparatus has a large capacity.

An apparatus in accordance with the invention may be stationary or transportable, so that it may be easily transported from one site to another on a dumping ground.

Figure 3:
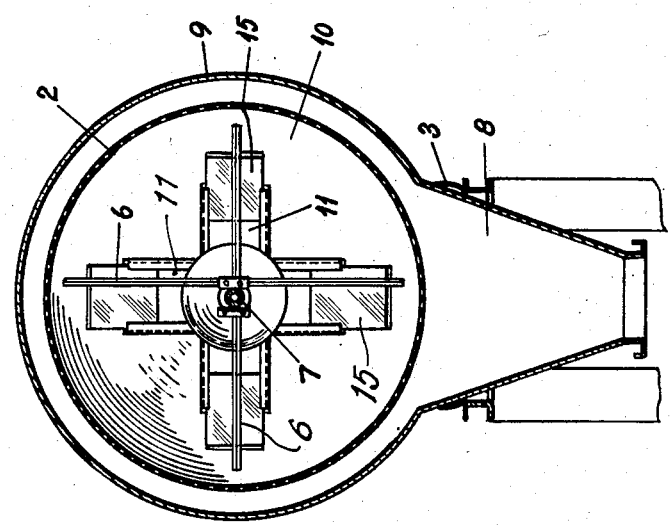
Figure 2:
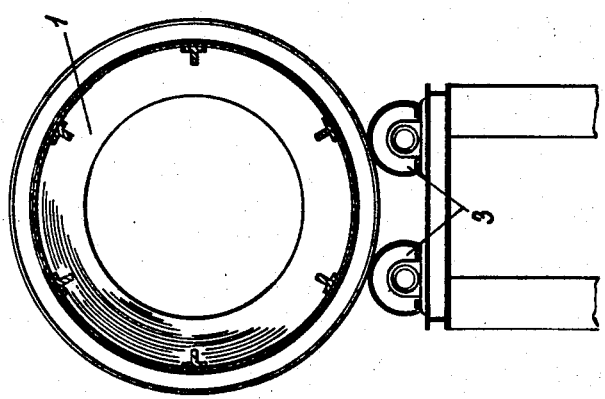

An embodiment of an apparatus according to the invention for stationary use is as an example shown on the drawing, Fig. 1 is a longitudinal sectional view through the middle of an apparatus embodying this invention;

Fig. 2 is a vertical sectional view taken on the plane of the line II—II of Fig. 1; and Fig. 3 is a vertical sectional view taken on the plane of the line III—III of Fig. 1.

The apparatus contains a rotatable fine sieve 1, which is built together with a rotatable disintegrating round sieve 2. They are carried by schematically shown rollers 3 and can be driven by means of a gearwheel (not shown) which engages a toothed ring 4.

The scavenging is fed into the fine sieve 1, contingently after iron parts have been separated by means of a magnet (not shown), and larger pieces of cloth have been sorted out so that the work of disintegration shall not be delayed. The fine waste is sifted out from the remainder of the coarse waste and falls down into a collecting hopper 5. The coarse waste is led, contingently after having been moistened on to the disintegrating round sieve 2, where the softer parts of the scavenging are disintegrated by being rubbed, for instance, against projections on the surface of the sieve. The cover of the disintegrating sieve can be cylindrical or frusto-conical. To increase the effect of the sieve 2, it is fitted with arms 6, which can be attached to a rotatable shaft 7. The arms may have the form of plates, rods or knives. They serve to increase the rubbing effect between the sieve and the projections thereon, and the waste, so that the softer parts thereof are more rapidly disintegrated. The number and location of the arms may be chosen to suit requirements. The type and shape of the projections and the size of the holes of the sieve must be adapted to the type of scavenging and the degree of fineness desired. The cover of the sieve may expediently be formed as a coarse grating iron. The finer particles of the coarse waste fall through the holes of the sieve to a collecting hopper 8 connected to a cover 9 which surrounds the sieve. In the end wall 10 of the sieve there are holes 11, larger than the holes in sieve 2, through which the coarser parts of the waste matter, which cannot be disintegrated in the disintegrating sieve, can pass out of the sieve and fall down in a hopper 12. Along the overflow edges of the holes 11 there are located sliding dampers 15 for the adjustment of the height of these overflow edges. A pulley 13 fixed to the shaft 7 serves to drive this. The arm carrying shaft can according to the invention be a hollow shaft, serving to introduce water for the spraying of the lighter parts of the waste matter as indicated by the dotted lines 14 near the connection between the fine sieve and the disintegraitng sieve.

I claim:

1. A drum sieve structure for the continuous treatment of rubbish and garbage material comprising at least two rigidly inter-connected drum sieves disposed coaxially in series with one another and defining respective compartments having their adjacent ends in open communication with each other, for free passage of the material through said drum sieves, and being as a unit rotatable about their common axis, the foremost compartment being equipped with means for sifting out the finer portions of the material under treatment and with spraying means for selectively moistening the lighter rubbish and garbage components which lie on top of the bulk of material within said foremost compartment, the rearmost compartment being equipped with a shaft rotatable relatively to its respective sieve and carrying arms for the comminution of the more easily disintegratable portions of said material, and an end wall closing the rear end of said rearmost compartment, the front end of the drum structure and the front end of the foremost compartment being open, said end wall being provided with damper adjustable holes larger than the holes of said rearmost sieve, said holes in the end wall being disposed adjacent said common axis and remote from the periphery of said rearmost sieve, thereby allowing larger parts of the material to escape from the rearmost compartment, thus enabling an uninterrupted operation of the drum sieve structure, and an automatic and continuous separating and removal of the non-disintegrated larger parts of the material.

2. A drum sieve structure as defined in claim 1, characterized by dampers slidably mounted on the end wall of the rearmost compartment for adjusting the size of the holes therein.

References Cited in the file of this patent

UNITED STATES PATENTS

| | | |
|---|---|---|
| 226,360 | Seck | Apr. 6, 1880 |
| 650,034 | Carkeek | May 22, 1900 |
| 1,076,061 | Quenner | Oct. 21, 1913 |
| 1,147,067 | Ansley | July 20, 1915 |
| 1,489,975 | Bluhm | Apr. 8, 1924 |
| 1,744,028 | Borton | Jan. 21, 1930 |
| 1,837,782 | Little | Dec. 22, 1931 |
| 2,556,486 | Smith | June 12, 1951 |
| 2,708,075 | Danyluke | May 10, 1955 |

FOREIGN PATENTS

| | | |
|---|---|---|
| 615,967 | Great Britain | Jan. 13, 1949 |
| 661,755 | France | Mar. 11, 1929 |